United States Patent [19]

Outhwaite

[11] Patent Number: 4,502,543

[45] Date of Patent: Mar. 5, 1985

[54] RISER UNION WITH CURVED SEAT

[75] Inventor: George F. Outhwaite, Santa Ana, Calif.

[73] Assignee: Hughes Tool Company, Houston, Tex.

[21] Appl. No.: 554,741

[22] Filed: Nov. 23, 1983

[51] Int. Cl.$^3$ .......................................... E21B 33/035
[52] U.S. Cl. .................................. 166/359; 166/367; 166/360
[58] Field of Search ............... 160/359, 360, 367, 206, 160/207, 208, 368, 88, 89; 285/332

[56] References Cited

U.S. PATENT DOCUMENTS

| | | | |
|---|---|---|---|
| 3,450,421 | 6/1969 | Harwell, Jr. | 166/359 X |
| 3,791,442 | 2/1974 | Watkins | 166/0.5 |
| 4,403,658 | 9/1983 | Watkins | 166/355 |

Primary Examiner—James A. Leppink
Assistant Examiner—Michael Starinsky
Attorney, Agent, or Firm—Robert A. Felsman; James E. Bradley

[57] ABSTRACT

A support and connection system for a riser run from a subsea well to a floating vessel has a female housing supported from the vessel that receives a male termination head secured to the riser string. The termination head fits within a tapered bore in the termination housing. Radial ports connect with radial passages in the termination head for transmitting fluids to and from the vessel and subsea well. A compound curved seat prevents jamming of the termination housing in the termination head due to the high tension placed on the termination housing. The seat is annular and also curves in a vertical direction.

4 Claims, 8 Drawing Figures

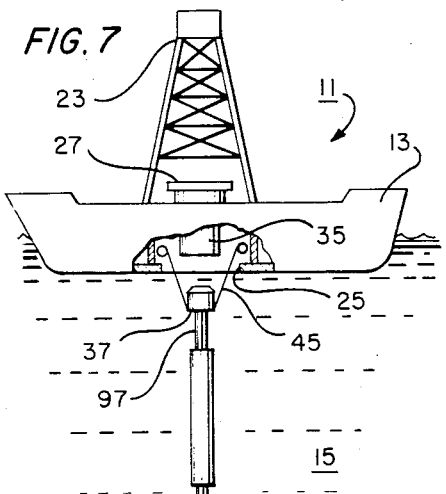
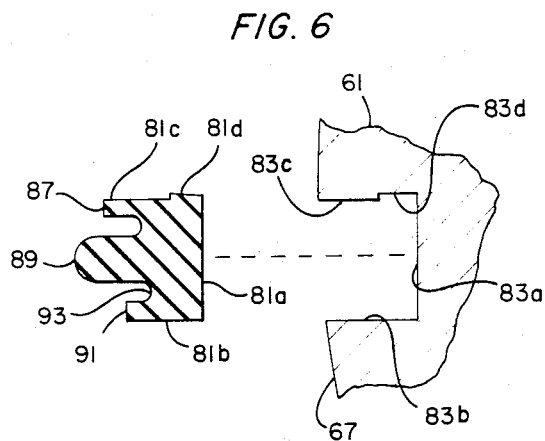
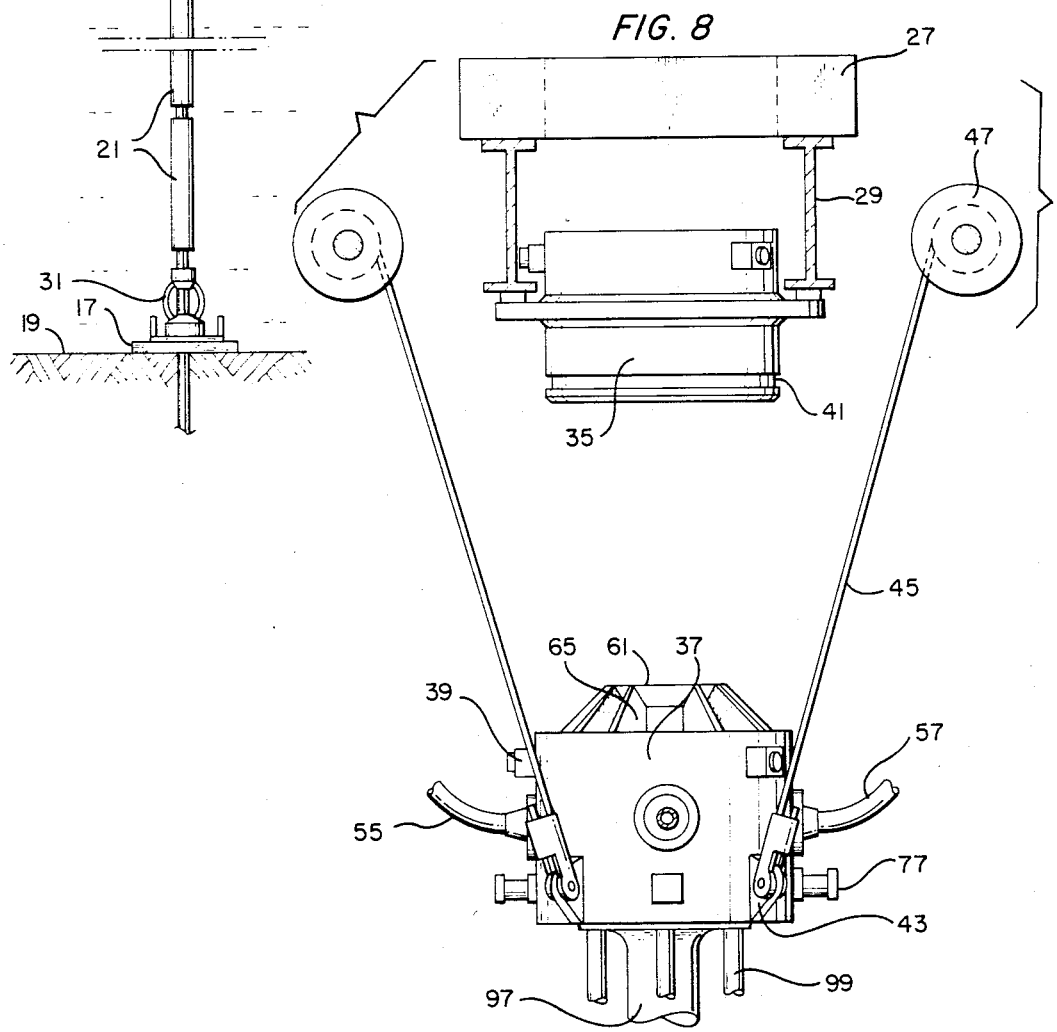

RISER UNION WITH CURVED SEAT

CROSS-REFERENCE TO RELATED APPLICATION

This application is being filed simultaneously with an application entitled "BI-DIRECTIONAL SELF-RETAINING CYLINDRICAL SURFACE SEAL", Daniel C. Woodman and Stephen A. Neely.

BACKGROUND OF THE INVENTION

1. Field of the Invention

This invention relates in general to a riser system that extends between a floating drilling or production platform and a subsea well, and in particular to a union connection at the top of the riser string.

2. Description of the Prior Art

In U.S. Pat. No. 4,403,658, issued Sept. 13, 1983, Bruce J. Watkins, a single stab union is shown for an offshore drilling or production platform. In the patent, at the top of the riser run or string, a termination head is adapted to be received within a female termination housing. The termination housing has a number of radial ports that register with passages located in the termination head. These ports contain high pressure fluid for transmission between the vessel and the subsea well. If it is necessary to disconnect the lower end of the riser from the subsea well temporarily, the termination head can be pulled upward from the termination housing. The lines or hoses connected to the termination housing can remain in place, connected to the housing.

In the Watkins patent, the housing has a longitudinal bore with a conical taper. The termination head has a mating conical exterior that seats within the bore of the termination housing. While connecting the lower end of the riser string to the subsea well and after connection, the termination housing is suspended on cables lowered from winches mounted on the vessel. The housing is thus under large tension forces which might cause it to ride up on the termination head. The conical seat may jam, making it very difficult to pull the termination head from the termination housing.

SUMMARY OF THE INVENTION

In this invention, the termination head and termination housing are similar to that shown in the Watkins patent, previously mentioned, but differ in the configuration of the seat. Rather than a conical seat, the seat is curved in a vertical direction. The curved mating surfaces provide for a tight seal, but prevent jamming. Preferably, the radius that forms the vertical curve of the seat is much greater than the diameter of the bore.

BRIEF DESCRIPTION OF THE DRAWINGS

FIG. 6 is a view of the seal similar to FIG. 5, but taken along the line VI—VI of FIG. 4.

FIG. 7 is a schematic view of a riser string connected between a floating vessel and a subsea well.

FIG. 8 is a partial, side view of the union of FIG. 1, shown in a position in which the termination housing is detached from the support housing of the vessel and suspended on cables.

DESCRIPTION OF THE PREFERRED EMBODIMENT

Figure 1:
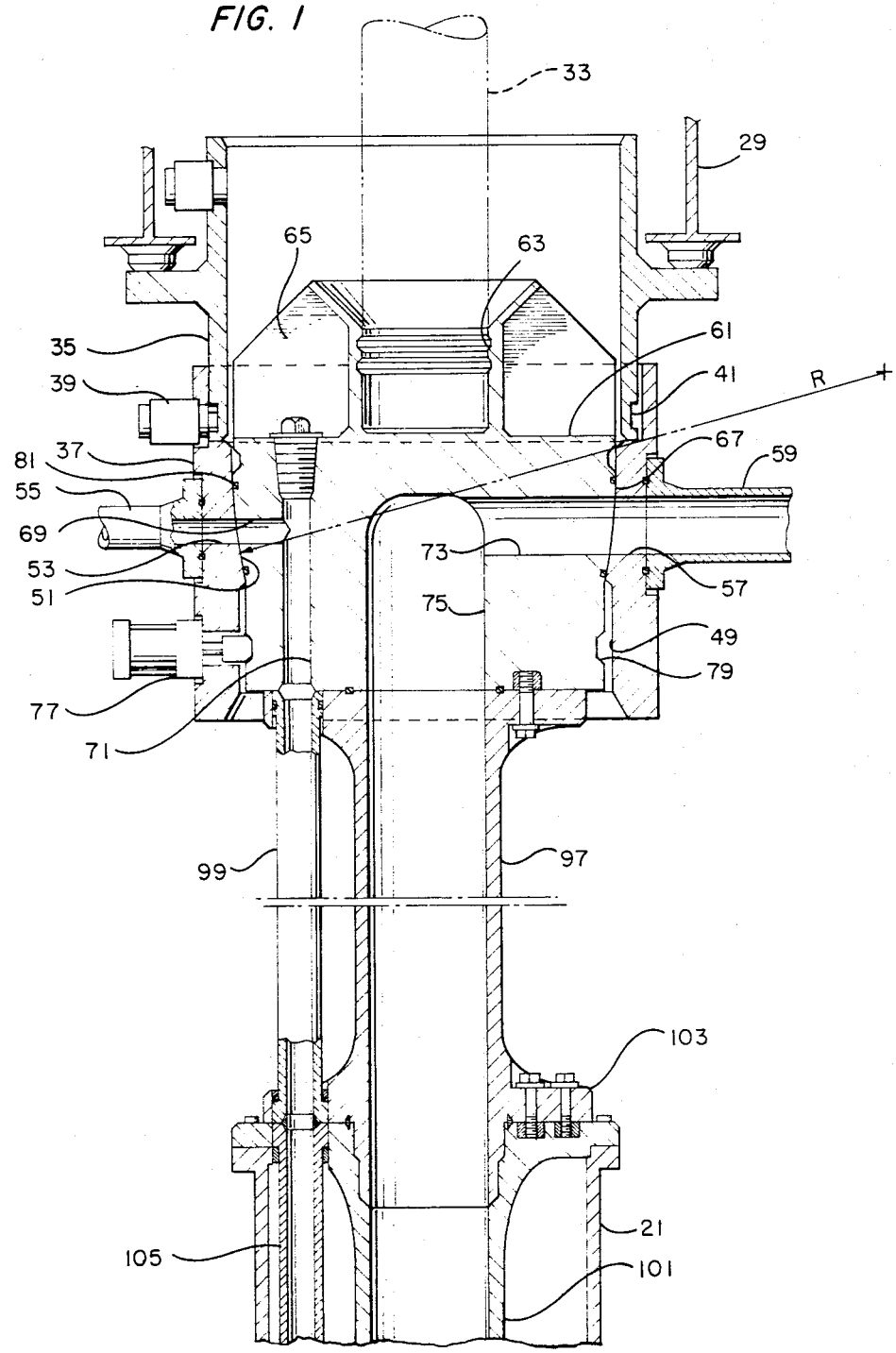
FIG. 1 is a vertical sectional view of a multiline single stab union for a riser and constructed in accordance with this invention.

Referring to FIG. 7, a subsea well assembly 11 is shown, including a platform or vessel 13 floating upon the sea 15 over a subsea well head 17 located on the sea bottom 19. The connection between the vessel 13 and well head 17 is achieved by a plurality of buoyant risers 21 joined end-to-end and lowered into the sea from the vessel 13 by a derrick 23 mounted thereon over an opening 25 through the vessel hull, known as a moonpool.

At the base of the derrick 23 is a stationary platform 27 supported upon I-beams 29 (FIG. 1) mounted directly to the vessel's superstructure. The stationary platform 27 is provided with a large opening therein for receiving and mounting a rotary table, not shown. The rotary table has a square aperture therein for driving oil well tools. Sections of the rotary table may be removed to provide access to the area below the platform 27 or to allow large oil well tools to be lowered by the derrick 23 therethrough into the moonpool 25 and down to the well head 17.

In assembling the production riser run, a lower production riser termination 31 is first placed upon the platform 27 by inserting a riser handling tool 33 (FIG. 1) into the uppermost portion of the production riser termination 31 and lifting. The riser termination 31 is connected to guidance cables (not shown) and then lowered below the platform 27 where it may be restrained from further lowering by a spider (not shown). The riser handling tool 33 is next used to raise a buoyant riser 21 into position over the riser termination 31. After the lower portion of riser 21 is bolted to the upper portion of riser termination 31, the spider is removed and the two assembled risers are lowered until the top of the riser 21 is aligned with platform 27. The spider is then replaced to retain the assembled risers in the desired position.

This procedure is repeated again and again until the desired length of riser run has been established. It is not uncommon for such a riser to extend some 6,000 feet from the vessel 13 to the sea bottom 19. A similar technique is used when assembling a drilling riser run.

Referring to FIG. 1, the stationary platform 27 includes a support housing 35 mounted to the lower surfaces of the I-beams 29 which, in turn, mount to the superstructure of vessel 13. A termination housing 37 is disconnectably mounted in the cylindrical bore of the support housing 35. Termination housing 37 is releasably secured to the support housing 35 by a plurality of hydraulically actuated locking cylinders 39 (only one shown). Each locking cylinder 39 is mounted to the wall of termination housing 37 and extends through a hole for engaging a groove 41 formed on the outer cylindrical surface of the support housing 35. Referring to FIG. 8, the termination housing 37 can be released from the support housing 35 by retracting the locking cylinders 39. Ears 43 are formed on the exterior of the termination housing 37. Cables 45 are connected to these ears. The cables extend to and are wrapped around winch pulleys 47 mounted on the vessel. Winch pulleys 47 are driven by winches (not shown) for constant tensioning of the riser string to prevent buckling.

Referring again to FIG. 1, termination housing 37 has an inner bore 49 that is longitudinal, with an open top and bottom. Bore 49 has a seat 51 located between the upper and lower ends of termination housing 37. Seat 51 is annular or circular. Seat 51 also curves in a vertical direction. The radius of curvature R, as indicated in FIG. 1, is much greater than the radius of the bore 49 at any point. Typically, the radius of curvature would be about five times the radius of bore 49 at its widest point. Curving in the vertical direction as well as being circular or annular, provides a generally conical, but compound curved surface. The upper edge of the seat 51 has a greater diameter than the lower edge of the seat. The increase in diameter of seat 51 from its lower edge to the upper edge is nonlinear.

A plurality of ports 53 (only one shown) extend radially through the termination housing and terminate midway along the length of the seat 51. Ports 53 are spaced around the exterior of the termination housing 37 and are connected to hoses 55 that lead to the vessel 13 (FIG. 7). These hoses deliver and receive various fluids, such as hydraulic fluid, used for performing operations on the subsea well. Similarly, a sales line port 57 extends through the termination housing 37, terminating centrally in the seat 51. Sales line 57 is of a larger diameter than the ports 53 and is connected to a sales outlet line 59 that extends to the vessel 13 (FIG. 7).

A termination head 61 is adapted to be received inside the termination housing 37. Termination head 61 is a male member located above the top of the string of risers 21 (FIG. 7). Termination head 61 is generally cylindrical, with a grooved bore 63 formed on its top. Bore 63 has a closed bottom and is adapted to receive the handling tool 33 for lifting the termination head 61. A webbed upper surface 65 formed on the termination head 61 aids in orienting the termination head with respect to the termination housing 37. Termination head 61 has an outer surface containing a seat 67 that has a mating configuration to seat 51. Seat 67 is curved in a vertical direction at the same radius of curvature as seat 51. Seat 67 has a greater diameter at the upper edge than at its lower edge.

A plurality of lateral passages 69 extend radially inward from the seat 67. Lateral passages 69 are spaced for registering or aligning with the ports 53. Lateral passages 69 terminate at vertical passages 71 that extend vertically through the termination head 61. The upper ends of the vertical passages 71 are plugged, as indicated, while the lower ends are open. Similarly, a lateral passage 73 aligns with the sales line port 57 and is of the same diameter. Lateral passage 73 extends to a vertical bore 75 that extends upwardly from the lower end of termination head 61. The upper end of bore 75 terminates at the lateral passage 73.

A plurality of hydraulically actuated locking means or cylinders 77 (only one shown) are mounted to the termination housing 37. Each locking cylinder 77 has a plunger or pawl that extends through holes in the termination housing 37 for engaging an annular groove 79 formed on the exterior of the termination head 61. Releasing cylinders 77 allows the handling tool 33 to pull the termination head 37 upward from the termination housing 37. The vertically curved seats 51 and 67 prevent the termination head 61, from moving downward any farther from its position of alignment shown in FIG. 1.

Figure 5:
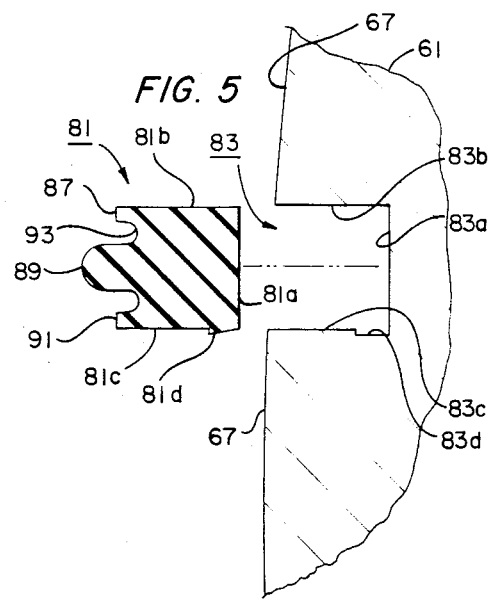
FIG. 5 is a sectional view of the seal of FIG. 3, taken along the line V—V of FIG. 4 and shown projected from the groove that contains it.

An elastomeric seal ring 81 surrounds the junction of each port 53 with each passage 69, and also surrounds the junction of the sales line port 57 with the sales line passage 73. Although only a single seal 81 is shown surrounding each junction, in practice, two seals 81 of different diameters are preferably used because of the high pressures normally encountered. The seal rings 81 are shown in FIG'S. 2-6. Referring to FIG. 5, each seal ring has a flat bottom or base 81a, an outer wall 81b and an inner wall 81c, both of which extend parallel to each other and perpendicular to base 81a. Outer wall 81b has a larger diameter than inner wall 81c. A protruding band 81d is formed on the inner wall 81c for retaining the ring 81. Band 81d tapers from a smaller diameter to a larger diameter, measured from base 81a.

Each seal ring 81 is located in a groove 83 formed in the seat 67 of the termination head 61. Groove 83 has a flat base 83a that is located in a single plane. Groove 83 has an outer wall 83b and an inner wall 83c that are parallel with each other and located perpendicular with respect to the base 83a. A recess 83d is formed on the inner wall 83c below the intersection of wall 83c with seat 67 and preferably at the junction of wall 83c with the base 83a. Recess 83d is cylindrical and is of a depth and thickness for receiving the band 81d to retain the seal ring 81 in the groove 83. The taper of band 81d facilitates entry into the recess 83d and prevents the seal ring 81 from being easily dislodged.

Figure 2:
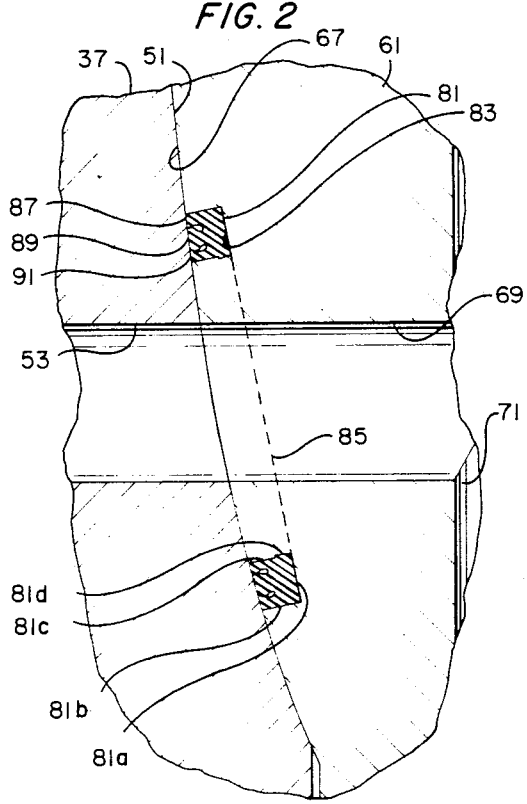
FIG. 2 is an enlarged vertical sectional view of a portion of the union of FIG. 1, particularly showing one of the seals surrounding one of the radial passages.
Figure 3:
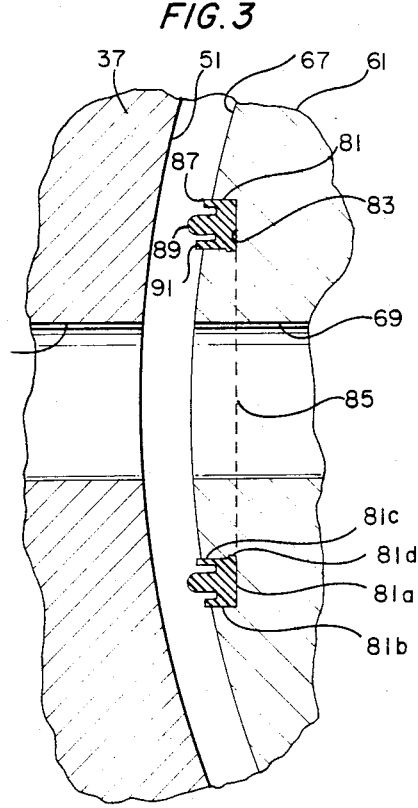
FIG. 3 is a horizontal sectional view of a portion of the union of FIG. 1, but shown prior to seating of the termination head in the termination housing.

As shown in FIG'S. 2 and 3, the base or bottom of groove 83 is formed in a single common plane 85. For example, it could be formed by a rotating circular cutting machining tool that has a lip of diameter equal to groove 83 and located in a common plane. The annular curvature of seat 67 as seen in FIG. 3, and the vertical curvature, as seen in FIG. 2, and the flat base 83a, causes the depth of the groove to vary as one proceeds around the diameter of the groove 83. The sides 83b and 83c have about the same depth as each other when measured at the top of the groove or the bottom because the vertical curvature of the seat 67 has a large radius compared to the groove width between walls 83b and 83c. FIG. 5 illustrates the cross-section at the top of the groove 83. However, at the extreme sides, or 90° from the top and bottom, the inner wall 83c will be of a greater depth than the outer wall 83b. The relatively small radius of the annular or horizontal curvature compared to the groove width between walls 83b and 83c, causes this difference in depth between the inner and outer sidewalls. The depths or heights of the inner and outer walls 83c and 83b will continuously vary when proceeding around the diameter of the groove 83 because of the curvature of the seat 67.

Also, both the inner wall 83c and the outer wall 83b at the top and the bottom have greater depths than the inner and outer walls 83c and 83b at the extreme sides, 90° from the top and bottom. As shown in FIG. 6, the outer wall 83b not only has a lesser depth than the inner wall 83c at the extreme side, but it is also of less depth than the outer wall 83b at the top, as shown in FIG. 5. Groove 83 is symmetrical and has the same depth 180° from any point measured on the groove, but continuously varies due to the curvature and the flat base 83a. The relatively large diameter of groove 83 compared to the diameter of seat 67 causes the continuous change in depth. Typically, the diameter of groove 83 is 25 percent or more of the maximum diameter of seat 67.

The seal ring 81 is formed of a continuously varying thickness in the same manner as described in connection with the groove 83. Seal ring 81 is symmetrical, but its thickness continuously varies when proceeding around the diameter. Its outer wall 81b, measured at the extreme side, as shown in FIG. 6, has a lesser length than the inner wall 81c, measured at the same point, and also a lesser length than the outer wall 81b at the top, as shown in FIG. 5. The lengths of the walls 81b and 81c vary proportionately to the walls 83b and 83c, but are of slightly greater height so as to cause the seal ring 81 to protrude uniformly from the groove at all points around the ring 81.

Seal ring 81 has a central lip 89 on the side opposite base 81a that protrudes outwardly from the groove 83a. Lip 89 is annular and is bounded by an outer lip 87 on the outer wall and an inner lip 91 on the inner wall. The lips 87 and 91 are separated from the central lip 89 by means of recesses 93. The diameter of outer lip 87 is greater than inner lip 91. The lips 87, 89 and 91 protrude uniformly from the groove 83 the same distance all around the diameter of the seal ring 81. Central lip 89 also protrudes uniformly from the groove 83 the same distance all around the diameter of seal ring 81. To accommodate the variance in thickness of the ring, the recesses 93 are located at continuously varying distances from the base 81a, as can be seen by comparing FIG'S. 5 and 6 with each other.

Figure 4:
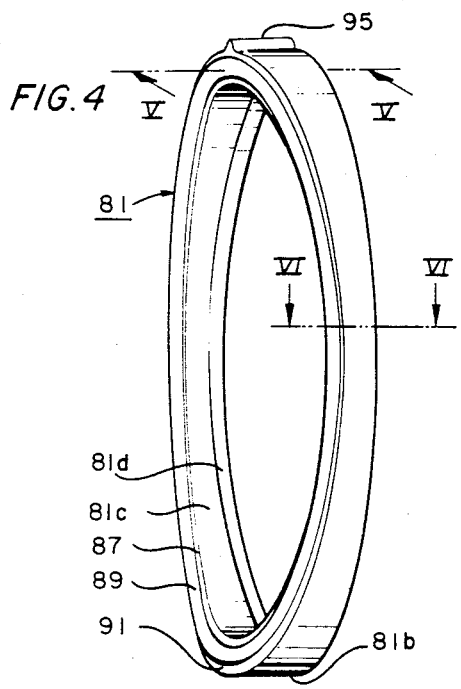
FIG. 4 is a perspective view of the seal of FIG. 2.

When the seal ring 81 is moved into sealing engagement with the seat 51, the central lip 89 will deform and push the lips 87 and 91 outward to cause them to also seal tightly against the seat, providing a bi-directional seal. A ridge 95, shown only in FIG. 4, is formed at the top of the seal ring 81 on outer wall 81b for reception within a slot (not shown) formed in groove 83 to properly orient the seal 81 with respect to groove 83.

Referring again to FIG. 1, the termination head 61 is connected on its lower end to a termination riser adapter joint 97. Adapter joint 97 is a tubular member having a bore through it that registers with the vertical bore 75 in the termination head 61. Flow lines 99 (only one shown) are spaced around the termination adapter joint 97. The flow lines 99 connect to the vertical passages 71 in the termination head 61. The termination adapter joint 97 is connected on its lower end to a tube 101 contained within the risers 21. A flange 103 formed on the termination adapter joint 97 provides the connection. The flow lines 99 extend sealingly through the flange 103 to connect with flow lines 105 located inside riser 21.

In operation, to run a riser string for production operations, the termination housing 37 will be coupled to the support housing 35 by the locking cylinders 39. A split bore protector (not shown) will be located inside the termination housing 37 for protecting it from risers 21 being lowered through it. Hoses 55 and 59 are connected to the termination housing 37. The lower production riser terminal 31 (FIG. 7) will be connected to a riser 21 and lowered through the termination housing 37 into the sea. Additional risers 21 are added until the lower production riser termination 31 is adjacent the subsea well 17 (FIG. 7).

The termination riser adapter joint 97 (FIG. 1) is then connected to the uppermost riser 21. The termination head 61 remains connected to the top of the termination riser adapter joint 97. The handling tool 33 is secured to the termination head 61, and the termination head 61 is lowered along with the riser string 21 until the termination head seats in the seat 51. The termination head 61 is oriented by a key (not shown) so that its passages 69 align with the ports 53. The locking cylinder 77 is actuated to lock the termination head 61 rigidly within the termination housing 37, preventing movement in a vertical direction with respect to the housing 37. The locking cylinder 77 also prevents any pivotal movement of the termination head 61 with respect to the termination housing 37, preventing the axis of termination head 61 from inclining vertically with respect to termination housing 37.

The locking cylinders 39 are then released and the termination housing 37, termination head 61, and riser string 21 are lowered into the sea by means of the handling tool 33. The entire riser string 21 will move downward and the lower production riser termination 31 will be connected to the subsea well head 17. Production may then begin.

If it becomes necessary to temporarily disconnect the riser 21, such as during a storm, handling tool 33 can be used to pull the riser string 21 upward, with the production riser termination 31 disconnected from the subsea well head 17. The termination housing 37 will be relocked into the support housing 35. The termination head 61 is then pulled up from the termination housing 37. The pulling of the riser string 21 then continues until the uppermost riser 21 has been pulled so that it can be supported on a spider (not shown) resting on platform 27 (FIG. 8). Through this arrangement, the riser run 21 may be disconnected from the well head 17 and placed in a hung-off position without the need for disconnecting any of the hoses 55 and 59, or exposing personnel to a dangerous work area over the moonpool.

The invention has significant advantages. The compound curved seat prevents jamming of the termination housing and the termination head together due to the high tension applied to the housing. The curved seats, however, provided for a tight fit for sealing against the extremely high pressures encountered through the various ports and passageways.

While the invention has been shown in only one of its form, it should be apparent to those skilled in the art that it is not so limited but is susceptible to various changes without departing from the scope of the invention.

I claim:

1. In a string of conduit extending from a subsea well to a floating platform having a connection assembly in the string that includes a housing having a longitudinal bore, a head adapted to slide into and seat within the bore of the housing, and a releasable locking means for locking the head into the housing so as to prevent any movement with respect to each other, the improvement comprising in combination:

an annular seat formed in the bore of the housing having a vertically curved configuration; and an annular seat formed on the exterior of the head and having a vertically curved configuration that is the same as the seat of the housing for mating with the seat of the bore;

the housing and the head each having a plurality of radial passages that extend to the seats for aligning with each other to transmit fluid between the housing and head.

2. In a string of conduit extending from a subsea well to a floating platform having a connection assembly in the string that includes a housing having a longitudinal bore with radially directed ports extending through the housing into the bore, and a head adapted to slide into the seat within the bore of the housing, the head having internal passageways that mate with the ports for communicating fluids, the improvement comprising in combination:

- an annular seat formed in the bore of the housing, through which the radial ports extend, the seat being curved in a vertical direction; and
- an annular seat formed on the exterior of the head and having a curved surface for mating with the seat of the bore, the passageways of the head extending to the seat of the head for aligning with the ports of the housing; and
- seal means for sealing around the junction of each of the ports and passageways;
- the seats each having an upper end that is larger in diameter than its lower end to allow the head to be lowered into the housing.

3. In a supporting connection system for a subsea well having a multi-sectioned riser run from a floating vessel to the well of a type having a termination head removably mounted within a termination housing and having adapter means for co-axially engaging an uppermost section of the riser run, and hose means connected between ports in the termination housing and vessel, the improvement comprising in combination:

- a longitudinal bore formed in the termination housing having an open top and bottom, the bore having an annular seat formed therein that is curved in a vertical direction and has a greater diameter at the top of the seat than at the bottom; the ports extending through the housing and into the seat;
- the seat having a radius of curvature in the vertical direction that is much greater than the horizontal radius of the seat at any point;
- an annular seat formed on the exterior of the termination head that is curved in a vertical direction the same as the seat of the housing for mating with the seat of the bore;
- a plurality of passages formed in the termination head and extending inward from the seat of the termination head for aligning with the ports in the housing; and
- locking means for locking the termination head within the termination housing, and for preventing the axis of the termination head from inclining with respect to the axis of the termination housing.

4. In a supporting connection system for a subsea well having a multi-sectioned riser run from a floating platform to the subsea well of a type having a support housing mounted upon the platform, a termination housing disconnectably engaging the support housing, the termination housing having a longitudinal bore with passageways extending through the termination housing, a termination head removably mounted within the longitudinal bore of the termination housing and having passageways therethrough that align with the passageways of the termination housing, the improvement comprising:

- an annular seat formed in the bore of the termination housing, through which the passageways of the termination housing extend, the seat being curved in a vertical direction;
- an annular seat formed on the exterior of the termination head with a configuration that is curved in a vertical direction the same as the seat of the bore for mating with the seat of the bore; the passageways in the termination head extending inwardly from the seat on the termination head for alignment with the passageways of the termination housing; and
- a plurality of seals located on one of the seats, each surrounding one of the passageways, for sealing the junctions of the passageways of the termination housing with the passageways of the termination head;
- each of the seats having a larger diameter on its upper end than its lower end to enable the termination head to be lowered into the termination housing.

* * * * *